United States Patent [19]
Godeau

[11] Patent Number: 5,901,987
[45] Date of Patent: May 11, 1999

[54] METHOD OF MAKING AN ENDPIECE, AN ENDPIECE AND A CONNECTOR MADE BY THE METHOD, AND A CIRCUIT INCLUDING SUCH A CONNECTOR

[75] Inventor: Denis Godeau, Les Grands Prés, France

[73] Assignee: Hutchinson, Paris, France

[21] Appl. No.: 08/714,770

[22] Filed: Sep. 16, 1996

[30] Foreign Application Priority Data

Sep. 18, 1995 [FR] France ................................. 95 10898

[51] Int. Cl.⁶ .................................................... F16L 39/00
[52] U.S. Cl. ............................... 285/148.19; 285/148.23; 285/294.3; 285/382.4; 285/915; 29/458; 29/469.5; 29/523
[58] Field of Search .................................. 285/293.1, 382, 285/915, 256, 295.3, 382.4, 382.5, 148.3, 148.19, 910, 235, 236, 259, 294.2, 296.1, 55, 908, 148.23; 264/265, 267; 29/523, 516, 458, 469.5, 506, 507, 508; 403/225, 228

[56] References Cited

U.S. PATENT DOCUMENTS

| | | |
|---|---|---|
| 4,330,144 | 5/1982 | Ridenour . |
| 4,480,860 | 11/1984 | Foresta et al. ..................... 285/236 X |
| 4,538,837 | 9/1985 | Cronk ................................. 285/236 X |
| 5,190,322 | 3/1993 | Hughes .............................. 285/910 X |
| 5,228,721 | 7/1993 | Whittle et al. ...................... 285/256 X |
| 5,398,976 | 3/1995 | Webb ................................. 285/236 X |
| 5,417,461 | 5/1995 | Dougherty et al. . |
| 5,547,232 | 8/1996 | Waterman ............................. 285/236 |
| 5,568,944 | 10/1996 | Kawasaki ....................... 285/293.1 X |

FOREIGN PATENT DOCUMENTS

| | | |
|---|---|---|
| 1450810 | 7/1966 | France . |
| 1809491 | 5/1970 | Germany . |
| 692696 | 6/1953 | United Kingdom .................. 403/228 |
| 2205373 | 12/1988 | United Kingdom . |

*Primary Examiner*—Heather Shackelford
*Attorney, Agent, or Firm*—Alston & Bird LLP

[57] ABSTRACT

The present invention relates mainly to a method of making an endpiece, to an endpiece and a connector made by said method, and also to a circuit including such a connector. According to the invention, a single gasket is provided which serves simultaneously to ensure sealing between a tubular duct and an endpiece-forming sleeve, and also between the male and female endpieces of the connector. The present invention is applicable to making a fluid circuit, in particular in the automobile industry. A main application of the present invention lies in making connectors for air conditioning circuits or oil circuits in motor vehicles.

24 Claims, 3 Drawing Sheets

METHOD OF MAKING AN ENDPIECE, AN ENDPIECE AND A CONNECTOR MADE BY THE METHOD, AND A CIRCUIT INCLUDING SUCH A CONNECTOR

The present invention relates mainly to a method of making an endpiece, to an endpiece and a connector made by said method, and to a circuit including such a connector.

BACKGROUND OF THE INVENTION

A leak from a hydraulic circuit, in particular a circuit belonging to the engine of a motor vehicle, can have consequences that are disastrous, running the risk of destroying the engine, or even worse, putting the safety of the occupants of the vehicle in danger. Consequently, the automobile industry uses tubular duct connectors of lifetime greater than that of the vehicle fitted therewith. Such connectors generally give satisfaction, but they are complex in structure and consequently high in price since they include a large number of parts.

OBJECTS AND SUMMARY OF THE INVENTION

Consequently, an object of the present invention is to provide an endpiece and a connector that are reliable and that are simple in structure.

Another object of the present invention is to provide such an endpiece that is of moderate cost.

It is also an object of the present invention to provide a method that is simple and quick for manufacturing an endpiece or a connector.

According to the invention, these objects are achieved by implementing a single gasket that provides sealing simultaneously between a tubular duct and an endpiece-forming sleeve, and also between the male and female endpieces of the connector.

The invention mainly provides a method of making a female endpiece for connection to one end of a tubular duct, the method comprising the following steps:

a) making a sleeve having a first zone for fixing on a tube and having an inside diameter substantially equal to or slightly greater than the outside diameter of the tube, a second zone for receiving a male endpiece, with the second zone having an inside diameter greater than that of the first zone, and a transition zone between the first zone and the second zone;

b) molding a gasket over the inside wall of the sleeve to extend from the first zone to the second zone where said gasket includes means for providing sealing with a male endpiece;

c) engaging the first zone of the sleeve on the end of the tube; and d) radially deforming the end of the tube and/or the sleeve so as to compress the gasket between the tube and the sleeve.

The invention also provides a method, including, between steps a) and b), a step e) consisting in treating the inside surface of the sleeve so as to enhance bonding with the gasket, in particular by depositing an adhesive film.

The invention also provides a method, wherein prior to step c) the method includes a step f) in which a collar is formed on the tube so that the outside diameter of the collar is greater than the inside diameter of the first zone of the sleeve, and wherein during step c), the sleeve is engaged on the tube until the end of the first zone of the sleeve rests against the collar of the tube.

The invention also provides a method, wherein in step d) a collar is formed on the tube facing the transition zone of the sleeve, said collar having an outside diameter that is greater than the inside diameter of the first zone of the sleeve.

The invention also provides a method, including the following steps, g) making a second sleeve;

h) placing a tubular duct radially between the second sleeve and the end of the tube remote from the first sleeve; and i) radially deforming the end of the tube and/or of the sleeve in such a manner as to compress the tubular duct between the tube and the sleeve.

The invention also provides a method, including the following step:

j) disposing a tubular duct between the end of the sleeve and the end of the tube remote from the gasket;

and wherein in step d) the radial deformation of the tube and/or of the sleeve serve(s) to compress the end of the tubular duct.

The invention also provides a female endpiece made by the method, comprising a sleeve having a first zone for fixing on the tube with the inside diameter of the first zone being substantially equal to or slightly greater than the outside diameter of the tube, a second zone for receiving a male endpiece, with the second zone having an inside diameter greater than the inside diameter to the first zone, and a transition zone between the first zone and the second zone, wherein the sleeve is provided with a gasket extending from the first zone to the second zone where it includes means for providing sealing with a male endpiece, and wherein said gasket is compressed between the tube and the first zone of the sleeve so as to guarantee sealing between the tubular duct and the sleeve.

The invention also provides an endpiece fixed on the end of a tubular duct compressed between the tube and a sleeve or a rear element of the sleeve.

The invention also provides an endpiece, wherein the gasket is made of elastomer, in particular of EPDM or of HNBR.

The invention also provides an endpiece, wherein the sleeve is a metal sleeve, in particular made of aluminum alloy.

The invention also provides an endpiece, wherein the sleeve is made of a plastics material.

The invention also provides an endpiece, wherein the tube is made of a metal, in particular an aluminum alloy.

The invention also provides an endpiece, wherein the tube is made of a plastics material.

The invention also provides a connector comprising an endpiece of the invention and a male endpiece.

The invention also provides a hydraulic circuit for motor vehicle air conditioning, including a connector of the invention.

BRIEF DESCRIPTION OF THE DRAWING

The invention will be better understood from the following description and the accompanying figures given as non-limiting examples, and in which:

FIGS. 1 to 7, the same references are used to designate the same elements.

MORE DETAILED DESCRIPTION

Figure 1:
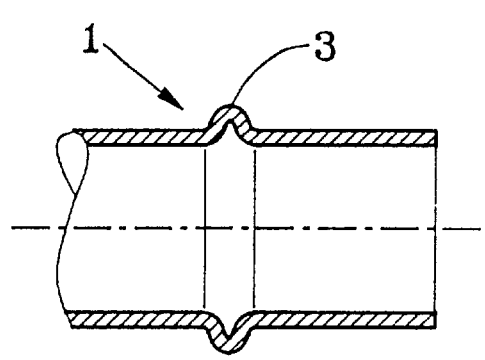
FIG. 1 is a longitudinal section view of the end of a tubular duct designed to receive an endpiece-forming sleeve of FIG. 2.

In FIG. 1, there can be seen the end of a tube 1 that presents good strength against crushing, e.g. a metal tube made of steel or of aluminum, which tube is to be provided with an endpiece. A tool is inserted into the end of the tube 1 to deform the wall of the tube plastically so as to form a collar 3.

Figure 2:
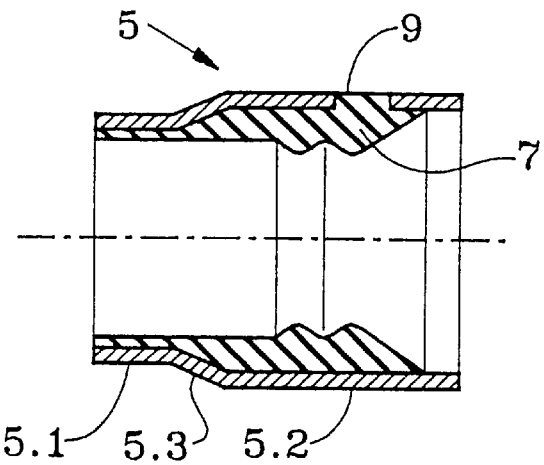
FIG. 2 is a longitudinal section view of a sleeve forming a female endpiece fitted with a sealing gasket.
Figure 4:
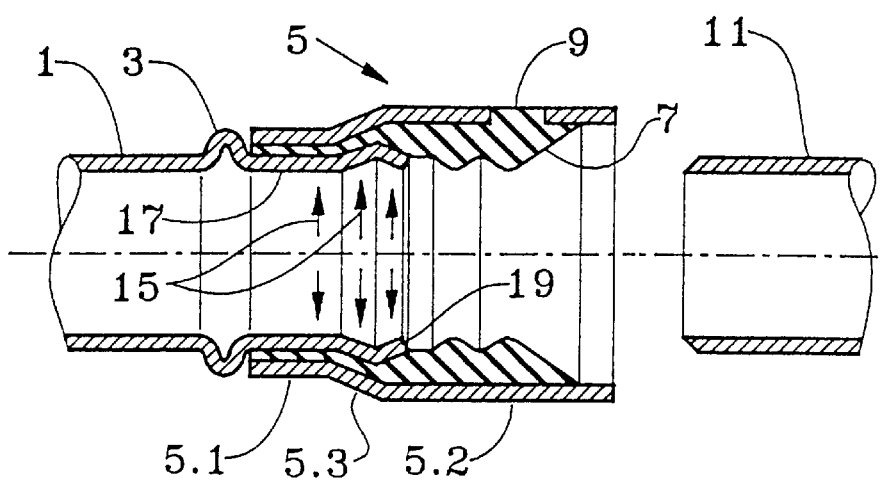
FIG. 4 is a longitudinal section view of a first embodiment of an assembled endpiece.

In FIG. 2, there can be seen a sleeve forming a female endpiece 5, e.g. made of aluminum, and comprising: a cylindrical first zone 5.1 for fixing on the tube 1, having an inside diameter that is substantially equal to or slightly greater than the outside diameter of the tube 1, but smaller than the diameter of the collar 3; a cylindrical second zone 5.2 for receiving a male endpiece and having a diameter that is greater than that of the first zone 5.1; and a transition zone 5.3 between the zones 5.1 and 5.2, with the transition zone being frustoconical in shape, for example. The endpiece 5 has a gasket 7 molded over the inside wall thereof, the gasket extending continuously over the three zones 5.1, 5.3, and 5.2, and being made, for example, of an elastomer, preferably of the EPDM or of the HNBR type. By way of example, the gasket 7 may be formed by placing the sleeve 5 in a mold and by injecting the elastomer through a radial opening 9. The inside surfaces of the sleeve may previously have received surface treatment, in particular a deposit of adhesive, to improve bonding between the gasket and the endpiece. The contact surface between the gasket 7 and a male endpiece 11 (FIG. 4) may include sealing lips, or projecting sealing ribs 13 as shown.

Figure 3:
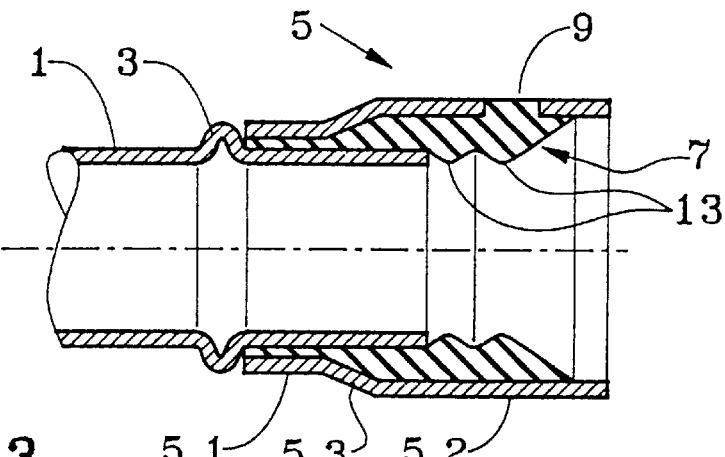
FIG. 3 is a longitudinal section view showing how the endpiece is installed on the end of the tubular duct.

As can be seen in FIG. 3, the sleeve 5 is fitted over the duct 1 until the end of the zone 5.1 abuts against the collar 3. A tool (not shown) is inserted via the zone 5.2 and imparts radial plastic expansion to the tube along arrows 15 so as to form a cylindrical zone 17 that is terminated adjacent to the end of the tube by a collar 19 extending at least in part in register with the frustoconical zone 5.3 of the sleeve 5. The elastomer of the gasket 7 is compressed between the sleeve 5 and the deformed wall of the tube. The zone 5.1 of the sleeve 5 is secured axially between the collars 3 and 19 of the tube 1. In a variant, the tool can deform the outer sleeve 5 plastically towards the axis. The endpiece of the invention can be connected to a male endpiece 11, e.g. located at the end of a hose or at the end of a vehicle component.

In this case, the gasket 7 ensures that the fluid is confined hermetically in the circuit and prevents leakage through the zone of contact with the male endpiece 11 in register with the zone 5.2 of the sleeve that forms the female endpiece 5, and also prevents leakage between the tube 1 and the zones 5.1 and 5.3 of the sleeve 5.

In association with the male endpiece 11, the endpiece of the present invention constitutes a connector which may advantageously be fitted with locking means, advantageously quick-locking means, for example such as the ring-locking means described in French patent application FR 94 02505, published under the No. 2 717 883, or the pin-locking devices described in French patent FR 92 09947, published under the No. 2 694 797.

Figure 5:
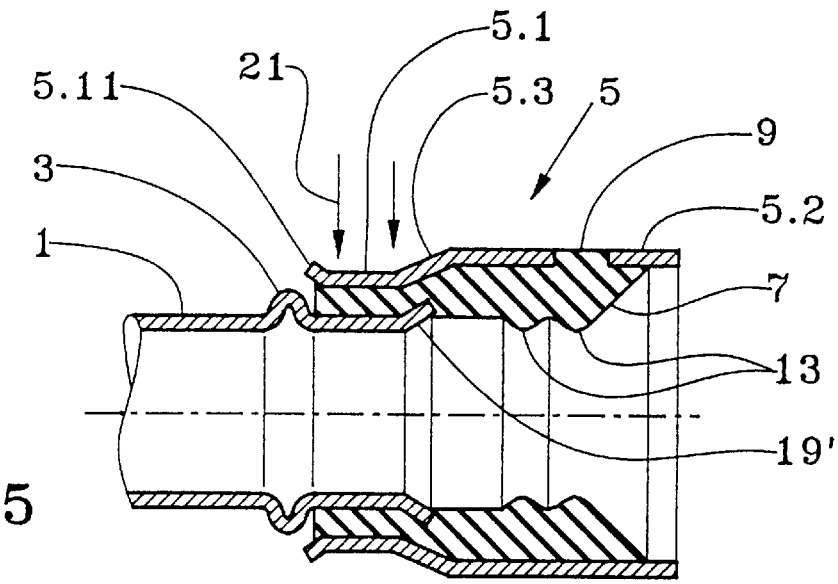
FIG. 5 is a longitudinal section view of a second embodiment of an assembled endpiece.

In the variant shown in FIG. 5, the end of the zone 5.1 of the sleeve 5 has a frustoconical bearing surface 5.11. The end of the tube 1 has a flare 19' whose outside diameter is substantially equal to the diameter of the collar 3. The sleeve 5 is fitted onto the tubular duct 1 until the bearing surface comes into abutment against the collar 3, and a clamping tool (not shown) is used to constrict the zone 5.1 of the sleeve 1 radially in the direction of arrows 21. The elastomer of the gasket 7 is compressed between the deformed zone 5.1 of the sleeve 5 and the wall of the tube 1. The zone 5.1 of the sleeve 5 is thus prevented from moving axially between the collar 3 and the flare 19' of the tube 1.

Figure 6:
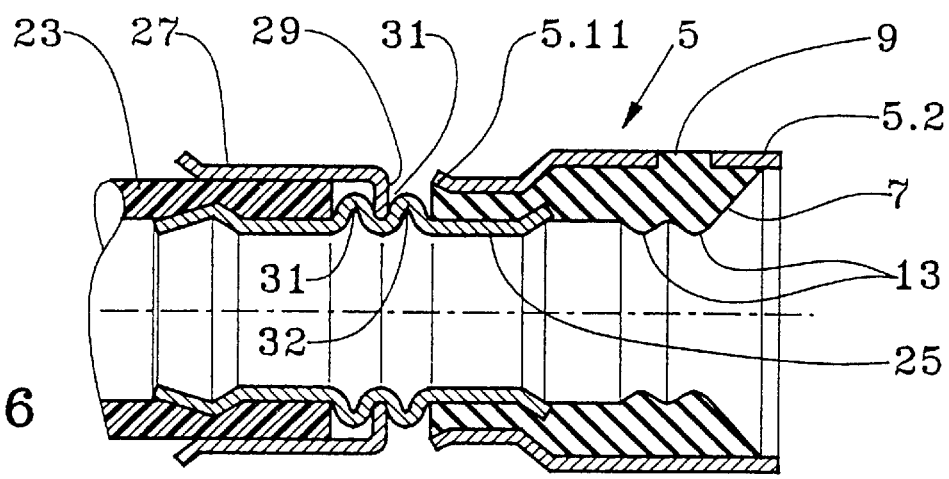
FIG. 6 is a longitudinal section view of a third embodiment of an assembled endpiece.

FIG. 6 shows a variant embodiment of the endpiece of the present invention suitable for being fixed to the end of a tubular duct 23 that does not have sufficient strength against crushing to enable the gasket 7 to be compressed. For example, the duct 23 may be a hose of flexible plastics material or of elastomer. A sleeve 5 is fixed on an intermediate tube 25 by outward deformation analogous to that performed in the embodiment of FIGS. 1 to 4, or advantageously by inward deformation analogous to that performed in the embodiment of FIG. 5. The tubular duct 23 is engaged on the intermediate tube 25 and is compressed between said intermediate tube 25 and a compression piece 27 which is advantageously external. In the embodiment shown, the tube 23 is compressed by axially inward deformation of a sleeve 27 whose end directed towards the sleeve 5 includes a radially-extending inside flange 29 for engaging in a radial groove 31 defined by two collars 3.1 and 3.2. Compressing the tubular duct 23 between the intermediate tube 25 and the sleeve 27 serves simultaneously to provide sealing and axial locking, and thus to fix the device of the present invention to the end of the tubular duct 23.

Figure 7:
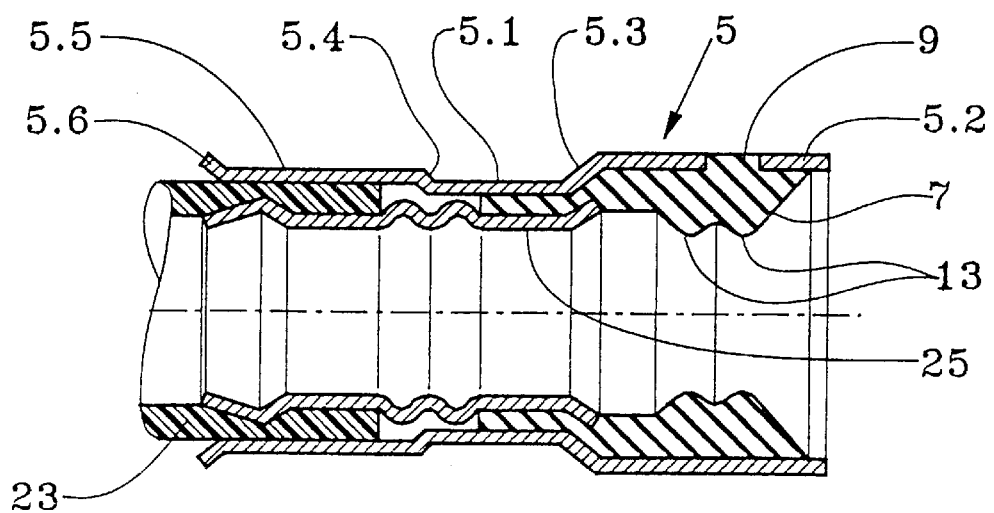
FIG. 7 is a longitudinal section view of a fourth embodiment of an assembled endpiece.

FIG. 7 shows an advantageous variant having a long sleeve 5 provided with a zone 5.5 for compressing the tubular duct 23 and terminated at a first end by a flare 5.6, with the opposite end of the zone 5.5 being terminated by a transition zone 504, e.g. a frustoconical zone, leading to the zone 5.1. A single outward or preferably inward deformation operation then advantageously enables the zones 5.1 and 5.5 of the sleeve 5 or the facing zones of the intermediate tube 25 to be deformed plastically in such a manner as to comprises the gasket 7 and also the tubular duct 23.

Figure 8:
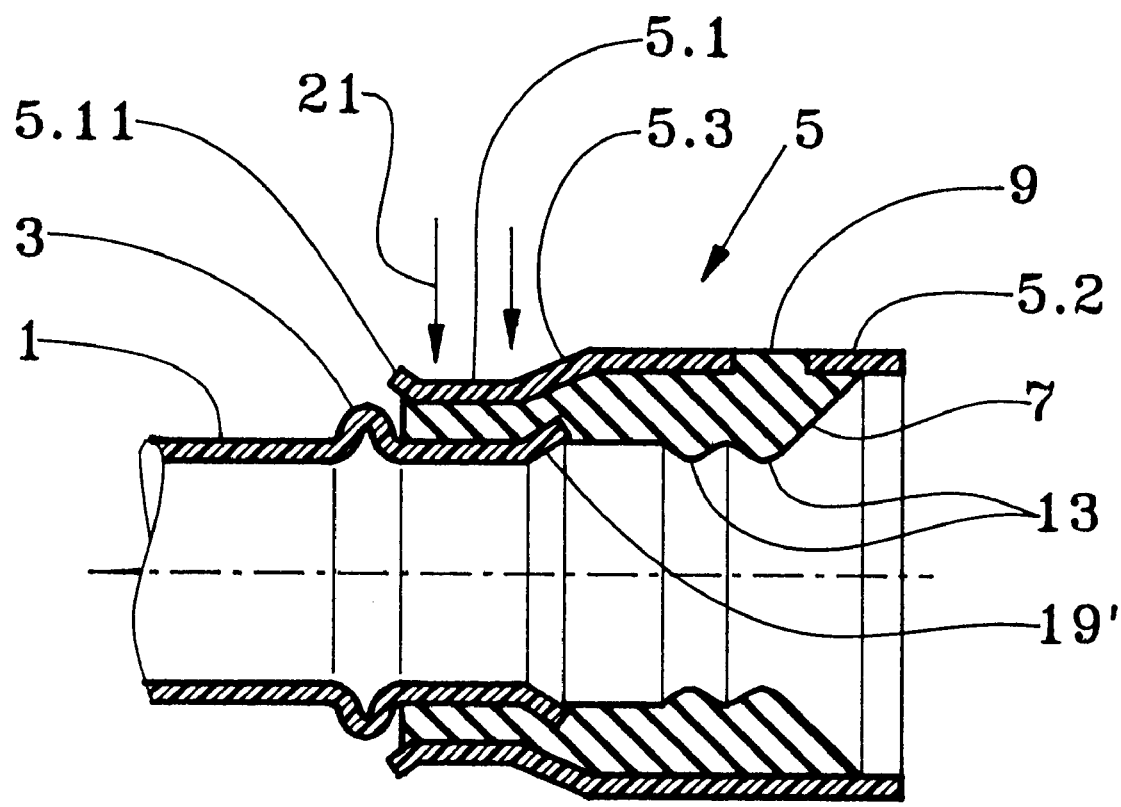
FIG. 8 is a longitudinal section view of a third embodiment of an assembled endpiece.

FIG. 8 illustrates an alternative embodiment of that shown in FIG. 5 wherein the sleeve 5 is formed of a plastic material.

The present invention is applicable to forming a fluid circuit, in particular in the automobile industry.

The present invention is mainly applicable to making connectors for air conditioning circuits or oil circuits in motor vehicles.

I claim:

1. A method of making a fluid circuit including a female endpiece, a tubular duct, and a male endpiece, the method comprising the following steps:

a) forming the female endpiece by forming a first sleeve having an inner surface which defines a first zone for fixing on the tubular duct and having an inside diameter at least substantially equal to an outside diameter of the tubular duct, a second zone for receiving the male endpiece, with the second zone having an inside diameter greater than that of the first zone, and a transition zone between the first zone and the second zone;

b) molding a gasket over the inner surface of the first sleeve to extend from the first zone to the second zone wherein said gasket includes means for providing sealing with the male endpiece;

c) engaging the first zone of the first sleeve on a respective end of the tubular duct; and d) radially, plastically deforming the end of the tubular duct or the first sleeve so as to compress the gasket between the tubular duct and the first sleeve.

2. A method according to claim 1, including, between steps a) and b), a step e) of treating the inner surface of the first sleeve so as to enhance bonding with the gasket.

3. A method according to claim 1, wherein prior to step c) the method includes a step e) of forming a collar having an outside diameter on the tubular duct so that the outside diameter of the collar is greater than the inside diameter of the first zone of the first sleeve, and wherein during step c), the first sleeve is engaged on the tubular duct until the end of the first zone of the first sleeve rests against the collar of the tubular duct.

4. A method according to claim 1, wherein in step d) a collar is formed on the tubular duct facing the transition zone of the first sleeve, said collar having an outside diameter that is greater than the inside diameter of the first zone of the first sleeve.

5. A method according to claim 1, including the following steps:

e) making a second sleeve and an intermediate tube;

f) placing the tubular duct radially between the second sleeve and a respective end of the intermediate tube remote from the first sleeve; and g) radially deforming the end of the intermediate tube or of the second sleeve in such a manner as to compress the tubular duct between the intermediate tube and the second sleeve.

6. A method according to claim 1, including the following step:

e) providing an intermediate tube and a second sleeve and disposing the tubular duct between a respective end of the second sleeve and a respective end of the intermediate tube remote from the gasket; and wherein in step d) the radial deformation of the tubular duct or of the first sleeve compresses an end of the tubular duct.

7. A method according to claim 2 wherein step (e) of treating the inner surface of the first sleeve includes depositing an adhesive film thereto.

8. A method according to claim 1 wherein step a) includes forming the transition zone to have a frustoconical configuration.

9. A fluid circuit including a tubular duct, a male endpiece, and a female endpiece, said female endpiece comprising a first sleeve having a first zone for fixing ,on the tubular duct and having an inside diameter which is at least substantially equal to an outside diameter of the tubular duct, a second zone for receiving the male endpiece, with the second zone having an inside diameter greater than the inside diameter of the first zone, and a transition zone between the first zone and the second zone, wherein the sleeve is provided with a gasket extending from the first zone to the second zone and includes means for providing sealing with the male endpiece, and wherein said gasket is plastically compressed between the tubular duct and the first zone of the sleeve so as to provide sealing between the tubular duct and the first sleeve.

10. A fluid circuit according to claim 9, wherein the first sleeve is a metal sleeve.

11. A fluid circuit according to claim 9, wherein the first sleeve is made of a plastics material.

12. A fluid circuit according to claim 7, wherein the tubular duct is made of a metal.

13. A fluid circuit according to claim 7, wherein the tubular duct is made of a plastic material.

14. A fluid circuit according to claim 9, further comprising an intermediate tube and compression sleeve wherein said female endpiece is fixed on the end of the tubular duct and is compressed between the intermediate tube and the compression sleeve.

15. A fluid circuit according to claim 9, wherein the gasket is made of an elastomer.

16. A fluid circuit according to claim 9 wherein said transition zone is frustoconical.

17. A method of making a fluid circuit including a female endpiece, a tubular duct, and a male endpiece, the method comprising the steps of:

a) forming the female endpiece by forming a first sleeve having an inner surface which defines a first zone for cooperating with the tubular duct and having an inside diameter at least substantially equal to an outside diameter of the tubular duct, a second zone having an inside diameter greater than the inside diameter of the first zone, and a transition zone between the first and second zones;

b) forming a collar on the tubular duct having an outside diameter which is greater than the inside diameter of the first zone of the first sleeve;

c) molding a gasket over the inner surface of the first sleeve to extend from the first zone to the second zone wherein the gasket includes means for providing a seal with the male endpiece;

d) engaging the first zone of the first sleeve on a respective end of the tubular duct so that a respective end of the first zone of the first sleeve rests against the collar of the tubular duct; and e) radially deforming the end of the tubular duct or the first sleeve so as to compress the gasket between the tubular duct and the first sleeve.

18. A method according to claim 17 further comprising the step f) before step c) of treating the inner surface of the first sleeve to enhance bonding of the first sleeve with a gasket.

19. A method according to claim 17 further including the steps of:

f) providing an intermediate tube and a second sleeve and disposing the tubular duct between a respective end of the second sleeve and a respective end of the intermediate tube remote from the gasket and wherein step e) includes radial deformation of the tubular duct or the first sleeve to compress an end of the tubular duct.

20. A method of making a fluid circuit including a female endpiece, a tubular duct, and a male endpiece, the method comprising the steps of:

a) forming the female endpiece by forming a first sleeve having an inner surface which defines a first zone for cooperating with the tubular duct and having an inside diameter at least substantially equal to an outside diameter of the tubular duct, a second zone having an inside diameter greater than the inside diameter of the first zone, and transition zone between the first and second zones;

b) molding a gasket over the inner surface of the first sleeve to extend from the first zone to the second zone wherein the gasket includes means for providing a seal with the male endpiece;

c) forming a collar on the tubular duct facing the transition zone of the first sleeve, said collar having an outside diameter that is greater than the inside diameter of the first zone of the first sleeve;

d) engaging the first zone of the first sleeve on a respective end of the tubular duct so that a respective end of the first zone of the first sleeve rests against the collar of the tubular duct; and e) radially deforming the end of the tubular duct on the first sleeve so as to compress the gasket between the tubular duct and the sleeve.

21. A method according to claim 20 further comprising the step f) before step b) of treating the inner surface of the first sleeve to enhance bonding of the first sleeve with the gasket.

22. A method according to claim 20 further including the steps of:

f) providing a second sleeve and an intermediate sleeve;

g) placing the tubular duct radially between the second sleeve and a respective end of the intermediate tube remote from the first sleeve; and h) radially deforming the end of the intermediate tube or the second sleeve so as to compress the tubular duct therebetween.

23. A method according to claim 20 further including the steps of:

f) providing an intermediate tube and a second sleeve and disposing the tubular duct between a respective end of the second sleeve and a respective end of the intermediate tube remote from the gasket and wherein step (e) includes radial deformation of the tubular duct or the first sleeve compresses the end of the tubular duct.

24. A method according to claim 16 further including the steps of:

f) providing a second sleeve and an intermediate sleeve;

g) placing the tubular duct radially between the second sleeve and a respective end of the intermediate sleeve remote from the first sleeve; and h) radially deforming the end of the intermediate tube or the second sleeve so as to compress the tubular duct therebetween.

* * * * *

UNITED STATES PATENT AND TRADEMARK OFFICE
CERTIFICATE OF CORRECTION

PATENT NO. : 5,901,987

DATED : May 11, 1999

INVENTOR(S) : Godeau

It is certified that error appears in the above-identified patent and that said Letters Patent is hereby corrected as shown below:

Column 5, line 52, before "on" cancel the comma (,).

Column 6, line 3 and 5, "claim 7", each occurrence, should read --claim 9--.

Column 8, line 12, "claim 16" should read --claim 17--.

Signed and Sealed this

Twelfth Day of October, 1999

Attest:

*Attesting Officer*

Q. TODD DICKINSON

*Acting Commissioner of Patents and Trademarks*